Sept. 17, 1963      H. A. MOORE      3,104,115

APPARATUS FOR CONVERTING SLEDS TO WHEELED VEHICLES

Filed Sept. 27, 1960      2 Sheets-Sheet 1

INVENTOR.
HERBERT A. MOORE

United States Patent Office 3,104,115
Patented Sept. 17, 1963

3,104,115
APPARATUS FOR CONVERTING SLEDS TO WHEELED VEHICLES
Herbert A. Moore, R.R. 1, Box 98, Valley Cottage, N.Y.
Filed Sept. 27, 1960, Ser. No. 58,756
2 Claims. (Cl. 280—8)

This invention relates to a device which consists essentially of axle hardware and special brackets for application to sled runners, the aparatus carrying a wheel in a bearing so that by mounting four such units on a sled, it can be converted into a wheeled vehicle.

The principal object of this invention is to take advantage of the fact that children, while enjoying sleds as toys, are severely limited by season in the extent to which sleds can be used.

It is a further object of the invention to provide a bracket and related hardware suitable for application of a wheel to a vehicle equipped with side runners, or, for that matter, to a vehicle having any upstanding side supports to which the bracket might be adapted.

Other objects and advantages of the invention will in part be obvious and in part appear hereinafter.

The invention, accordingly, is concerned with an apparatus for mounting a wheel on a device such as a sled, the apparatus consisting of a short axle, a wheel carried on the axle in apropriate bearings, a spacer block and appropriate additional hardware for clamping the block, brackets, and the sled runners at a level such that the runners and the brackets are off the ground and the vehicle will run freely on the wheels thus provided, the wheels being mounted at points separate from each other in such manner that the ordinary steering of the sled accompanied by flexing the body and the runners is effective to steer the device when the wheels are mounted in place.

The details of construction of the device will be better understood by reference to the accompanying drawings in which FIGURE 1 is a general side elevation of a sled showing the method of placing the wheels;

Figure 1:
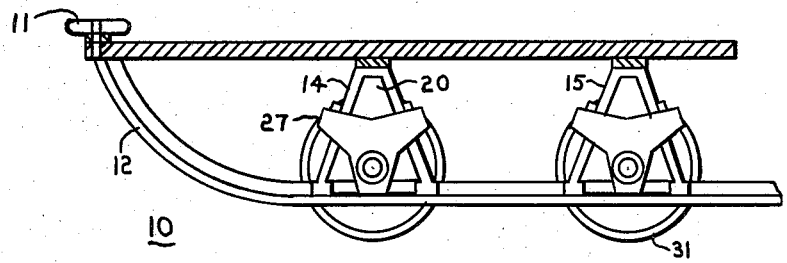
Figure 2:
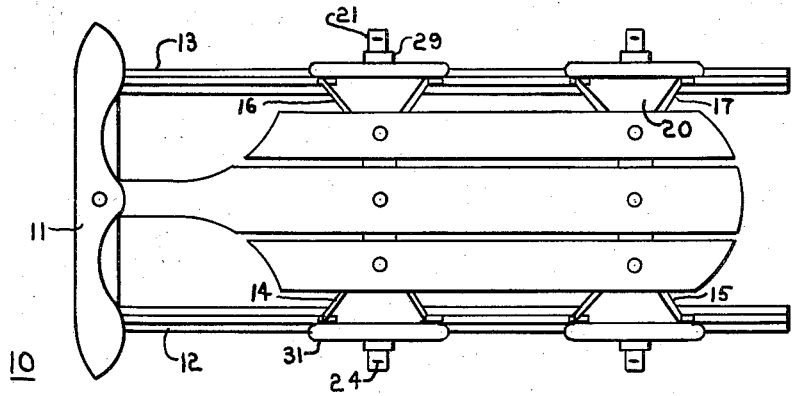
FIGURE 2 is a plan view of the sled showing the relationship of the mounted wheels to the body of the sled.

Referring now to FIGURE 1, it represents a sled 10 having typical steering rod 11 articulated with runners 12 and 13. The runners are mounted on the sled body with the conventional form of vertical supports 14, 15 and 16, 17.

Since the points of support of the runners 14, 15, 16, and 17 are the stable points on a rectangle and the steering of the sled is actually done by placing the arcuate portions of the runners forward of these points, the vertical supports suggest themselves as appropriate basis for the application of hardware for the attachment to the wheels.

Figures 3, 4:
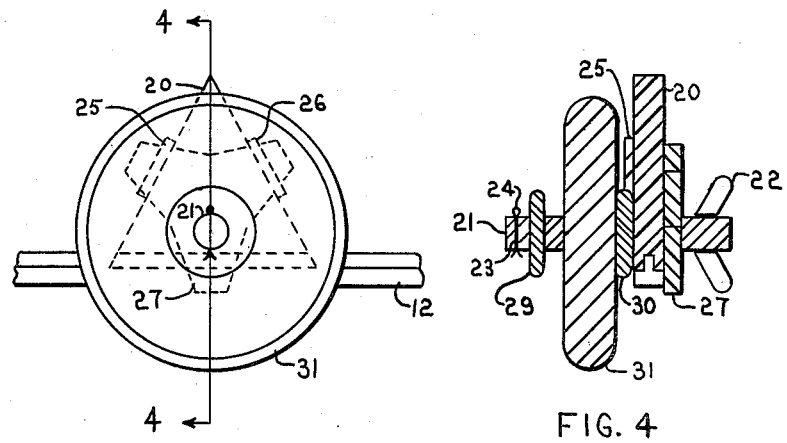
FIGURE 3 is a detailed side elevation of the hardware involved in the application of a wheel to the runner.
FIGURE 4 is a section taken along the line 4—4 of FIGURE 3.

Referring now to FIGURES 3 and 4, for details of the construction of the particular form of this device, 12 represents a runner of the sled which, it will be noted, has the typical broadened T-shaped section. The vertical support for the runner by means of which it is attached to the sled is an A-frame, and, accordingly, the main support for the runner in the instant situation is block 20 which is fitted within the A-frame of this vertical support. Block 20 also is perforated to provide for carrying the axle 21, the end of which is threaded and carries wing nut 22. The opposite end of the axle carries an opening 23 in which cotter pin 24 can be inserted to hold the wheel containing apparatus in place.

Block 20 will also contain a longitudinal groove for receiving a section of the runner track which lies within the bounds of where the vertical supports are attached to the runner, and the remaining sides of the said block will have outer flange 25 and outer flange 26.

Plate 27 is a Y-shaped bracket which is clamped on the inner side of the main block 20 by means of the axle 21 and the wing nut with the axle 21 serving as a bolt so that the combination of plate 27 and block 20 may be drawn-up tight to form a unitary structure with the A-frame on the sled. Mounted on the axle thus carried is a pair of spacer washers 29 and 30 which carry the wheel 31 at an appropriate point on the axle. The wheel itself may be secured with its own internal bearings, and details of that kind of structure need not be given.

As a variation, I have found that complementary Y-shaped brackets may be clamped on either side of block 20 by means of the axle and the wing nut with the axle serving as a bolt so that a combination of the two, block and complementary brackets, being drawn up tight will form a unitary structure on the A-frame on the sled. Of course, when the two Y-shaped brackets are employed, one on each side of the main block, outer flange 25 and outer flange 26 will not be necessary. Needless to say, the spacer washers and the wheel will be in their proper mounted positions as heretofore described.

It may be noted that for purposes of convenience and making the unit one which can be fitted to any sled, the block 20 is preferably made as a tough, moldable, but nevertheless machinable plastic, such, for example, as Teflon or polyethylene, which will permit of its being trimmed to size to fit closely to the A-frame on the block. The Y-shaped bracket, or brackets, is of appropriate weight of sheet metal having the ends of the Y crimped so that the block is firmly grasped within the A-frame, and with the tightening of the bolt it will hold the structure firmly in place.

Figure 5:
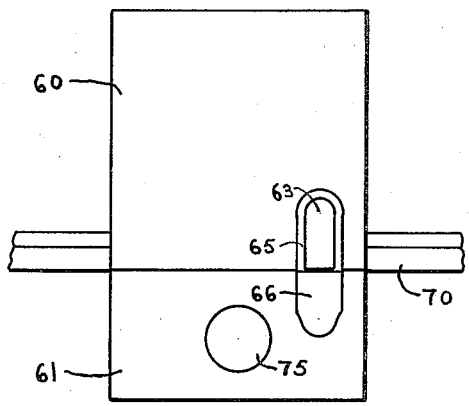
FIGURES 5 and 6 illustrate an alternative form of hardware for the application of wheels to a sled.
Figure 6:
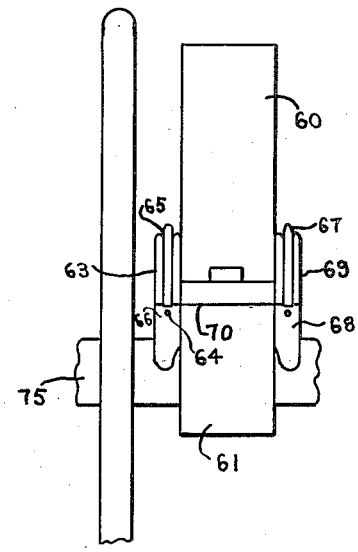

In FIGURES 5 and 6 an alternative version of the device is shown which consists essentially of the moldable section of plastic 60 having the matching section 61 facing it to form a unitary block on or around the runner of a sled. The groove for receiving the runner track itself can be shaped approximately like the sled runner, with the final adjustment to be left for the user of the device. For the complete fastening of this hardware on the sled runner, the upper or lower section of the plastic block has molded into it staple 63, and the other section has molded into it pin 64 which serves as a hinge point for the hasp 65, 66. On the opposite face of the plastic blocks a similar arrangement for mounting hasp 67, 68 and having it hook staple 69 is provided. By matching the two blocks of plastic and closing the hasps, the blocks are quickly set in place. Orientation of the blocks can be varied to place the runner 70 above or below the axle to place the axle and wheel above or below the runner of the sled as indicated at 75 in FIGURE 6.

Though the invention has been described with reference to only a few specific examples, it is to be understood that variants thereof may be developed without departing from its spirit or scope.

What is claimed is:

1. An attachment for converting a sled, having runners, to a wheeled vehicle comprising substantially a triangular unit attachment adapted to be fitted to a vertical A support on the runner of the sled, wherein one of the sides of said triangular unit contains a longitudinal groove of substantial width and depth to allow a sled runner to be engaged therein, each of the remaining sides of said triangular unit has one flanged edge to fit over and flush against the respective vertical support of the runner of the sled; said triangular unit attachment being further adapted to be clamped in said vertical support by a clamping means wherein said triangular unit has a circular opening within its body of sufficient diameter to allow an axle as part of said clamping means to pass therethrough.

2. An attachment for converting a sled, having runners, to a wheeled vehicle comprising substantially a triangular unit attachment adapted to be fitted to a vertical A support on the runner of the sled, wherein one of the sides of said triangular unit contains a longitudinal groove of substantial width and depth to allow a sled runner to be engaged therein, each of the remaining sides of said triangular unit has one flanged edge to fit over and flush against the respective vertical support of the runner of the sled; said triangular unit attachment being further adapted to be clamped in said vertical support by a clamping means wherein said triangular unit has a circular opening within its body of sufficient diameter to allow an axle as part of said clamping means to pass therethrough, said clamping means comprising a Y-shaped bracket, an axle carried by said bracket and the triangular unit, said axle having a mounted wheel, spacer washers and capable of serving as a bolt for a nut, and thereafter as said nut is tightened the attachment is clamped into position by said spacer washers and nut to provide a unitary structure.

References Cited in the file of this patent

UNITED STATES PATENTS

| | | |
|---|---|---|
| 1,304,331 | Leicht | May 20, 1919 |
| 1,412,413 | Meyer | Apr. 11, 1922 |
| 1,456,335 | Peterson | May 22, 1923 |
| 1,607,283 | Korn | Nov. 16, 1926 |
| 2,024,423 | Brunetti | Dec. 17, 1935 |
| 2,437,903 | Zullig | Mar. 16, 1948 |
| 2,885,214 | Toohey | May 5, 1959 |

FOREIGN PATENTS

| | | |
|---|---|---|
| 584,159 | France | Nov. 13, 1924 |